US008651960B2

(12) United States Patent
Malik (10) Patent No.: US 8,651,960 B2
(45) Date of Patent: *Feb. 18, 2014

(54) SYSTEM, METHOD AND COMPUTER PROGRAM FOR ENABLING AN INTERACTIVE GAME

(71) Applicant: AT&T Intellectual Property I, L.P., Atlanta, GA (US)

(72) Inventor: Dale Malik, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/659,524

(22) Filed: Oct. 24, 2012

(65) Prior Publication Data

US 2013/0079127 A1   Mar. 28, 2013

Related U.S. Application Data

(63) Continuation of application No. 11/303,725, filed on Dec. 15, 2005, now Pat. No. 8,317,618.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .......................................................... 463/42

(58) Field of Classification Search
None
See application file for complete search history.

(56) References Cited

U.S. PATENT DOCUMENTS

| | | |
|---|---|---|
| 3,798,610 A | 3/1974 | Bliss et al. |
| 3,886,302 A | 5/1975 | Kosco |
| 4,130,833 A | 12/1978 | Chomet |
| 4,258,386 A | 3/1981 | Cheung |
| 4,264,925 A | 4/1981 | Freeman et al. |
| 4,361,851 A | 11/1982 | Asip et al. |
| 4,488,179 A | 12/1984 | Kruger et al. |
| 4,566,030 A | 1/1986 | Nickerson et al. |
| 4,567,591 A | 1/1986 | Gray et al. |
| 4,573,072 A | 2/1986 | Freeman |
| 4,598,288 A | 7/1986 | Yarbrough et al. |
| 4,688,248 A | 8/1987 | Tomizawa |
| 4,689,661 A | 8/1987 | Barbieri et al. |
| 4,698,670 A | 10/1987 | Matty |
| 4,720,873 A | 1/1988 | Goodman et al. |
| 4,816,904 A | 3/1989 | McKenna et al. |
| 4,862,268 A | 8/1989 | Campbell et al. |

(Continued)

FOREIGN PATENT DOCUMENTS

WO    9414284    6/1994

OTHER PUBLICATIONS

Berkowitz, Ben "Developers interacting with Sony set-top box", Cable Worlds May 21, 2001.

(Continued)

*Primary Examiner* — Michael Cuff
*Assistant Examiner* — Kevin Y Kim
(74) *Attorney, Agent, or Firm* — Toler Law Group, PC (57) ABSTRACT

A system, method and computer program enable an interactive game. A game server, in response to a user request, provides a unique identifier associated with an instance of the interactive game. The game server forwards one or more invitations to join the interactive game in accordance with the user request. Thereafter, the game server registers one or more wireless communication devices to be used as data controllers for use by participants that join the game.

20 Claims, 5 Drawing Sheets

(56) References Cited

U.S. PATENT DOCUMENTS

| | | |
|---|---|---|
| 4,890,332 A | 12/1989 | Takahashi |
| 4,912,552 A | 3/1990 | Allison, III et al. |
| 5,010,585 A | 4/1991 | Garcia |
| 5,010,858 A | 4/1991 | Schierling et al. |
| 5,038,211 A | 8/1991 | Hallenbeck |
| 5,046,090 A | 9/1991 | Walker et al. |
| 5,046,092 A | 9/1991 | Walker et al. |
| 5,055,924 A | 10/1991 | Skutta |
| 5,161,019 A | 11/1992 | Emanuel |
| 5,173,900 A | 12/1992 | Miller et al. |
| 5,181,438 A | 1/1993 | Wellman |
| 5,191,645 A | 3/1993 | Carlucci et al. |
| 5,208,665 A | 5/1993 | McCalley et al. |
| 5,247,347 A | 9/1993 | Litteral et al. |
| 5,249,044 A | 9/1993 | Von Kohorn |
| 5,260,778 A | 11/1993 | Kauffman et al. |
| 5,262,860 A | 11/1993 | Fitzpatrick et al. |
| 5,287,181 A | 2/1994 | Holman |
| 5,335,277 A | 8/1994 | Harvey et al. |
| 5,339,315 A | 8/1994 | Maeda et al. |
| 5,343,240 A | 8/1994 | Yu |
| 5,357,276 A | 10/1994 | Banker et al. |
| 5,374,951 A | 12/1994 | Welsh |
| 5,390,027 A | 2/1995 | Henmi et al. |
| 5,404,393 A | 4/1995 | Remillard |
| 5,444,499 A | 8/1995 | Saitoh |
| 5,446,490 A | 8/1995 | Blahut et al. |
| 5,446,919 A | 8/1995 | Wilkins |
| 5,481,542 A | 1/1996 | Logston et al. |
| 5,483,277 A | 1/1996 | Granger |
| 5,502,499 A | 3/1996 | Birch et al. |
| 5,539,451 A | 7/1996 | Carey et al. |
| 5,539,822 A | 7/1996 | Lett |
| 5,541,917 A | 7/1996 | Farris |
| 5,555,838 A | 9/1996 | Bergman |
| 5,557,320 A | 9/1996 | Krebs |
| 5,557,338 A | 9/1996 | Maze et al. |
| 5,585,838 A | 12/1996 | Lawler et al. |
| 5,585,858 A | 12/1996 | Harper et al. |
| 5,592,477 A | 1/1997 | Farris et al. |
| 5,600,775 A | 2/1997 | King et al. |
| 5,608,448 A | 3/1997 | Smoral et al. |
| 5,629,733 A | 5/1997 | Youman et al. |
| 5,640,192 A | 6/1997 | Garfinkle |
| 5,648,824 A | 7/1997 | Dunn et al. |
| 5,661,517 A | 8/1997 | Budow et al. |
| 5,721,829 A | 2/1998 | Dunn et al. |
| 5,779,549 A | 7/1998 | Walker et al. |
| 5,781,246 A | 7/1998 | Alten et al. |
| 5,784,683 A | 7/1998 | Sistanizadeh et al. |
| 5,796,426 A | 8/1998 | Gullichsen et al. |
| 5,805,154 A | 9/1998 | Brown |
| 5,818,438 A | 10/1998 | Howe et al. |
| 5,820,459 A | 10/1998 | Acres et al. |
| 5,822,123 A | 10/1998 | Davis et al. |
| 5,828,420 A | 10/1998 | Marshall et al. |
| 5,847,771 A | 12/1998 | Cloutier et al. |
| 5,864,823 A | 1/1999 | Levitan |
| 5,867,205 A | 2/1999 | Harrison |
| 5,880,768 A | 3/1999 | Lemmons et al. |
| 5,880,769 A | 3/1999 | Nemirofsky et al. |
| 5,892,508 A | 4/1999 | Howe et al. |
| 5,931,908 A | 8/1999 | Gerba et al. |
| 5,977,964 A | 11/1999 | Williams et al. |
| 5,990,927 A | 11/1999 | Hendricks et al. |
| 6,005,561 A | 12/1999 | Hawkins et al. |
| 6,008,802 A | 12/1999 | Iki et al. |
| 6,012,983 A | 1/2000 | Walker et al. |
| 6,018,764 A | 1/2000 | Field et al. |
| 6,025,837 A | 2/2000 | Matthews, III et al. |
| 6,100,883 A | 8/2000 | Hoarty |
| 6,108,042 A | 8/2000 | Adams et al. |
| 6,113,495 A | 9/2000 | Walker et al. |
| 6,157,413 A | 12/2000 | Hanafee et al. |
| 6,201,536 B1 | 3/2001 | Hendricks et al. |
| 6,213,880 B1 | 4/2001 | Sim |
| 6,230,172 B1 | 5/2001 | Purnaveja et al. |
| 6,240,555 B1 | 5/2001 | Shoff et al. |
| 6,244,957 B1 | 6/2001 | Walker et al. |
| 6,256,785 B1 | 7/2001 | Klappert et al. |
| 6,317,885 B1 | 11/2001 | Fries |
| 6,324,544 B1 | 11/2001 | Alam et al. |
| 6,324,694 B1 | 11/2001 | Watts et al. |
| 6,327,574 B1 | 12/2001 | Kramer et al. |
| 6,357,042 B2 | 3/2002 | Srinivasan et al. |
| 6,418,556 B1 | 7/2002 | Bennington et al. |
| 6,419,137 B1 | 7/2002 | Marshall et al. |
| 6,463,207 B1 | 10/2002 | Abecassis |
| 6,463,585 B1 | 10/2002 | Hendricks et al. |
| 6,468,155 B1 | 10/2002 | Zucker et al. |
| 6,477,579 B1 | 11/2002 | Kunkel et al. |
| 6,502,242 B1 | 12/2002 | Howe et al. |
| 6,535,889 B1 | 3/2003 | Headrick et al. |
| 6,557,006 B1 | 4/2003 | Headrick et al. |
| 6,567,982 B1 | 5/2003 | Howe et al. |
| 6,615,408 B1 | 9/2003 | Kaiser et al. |
| 6,634,942 B2 | 10/2003 | Walker et al. |
| 6,676,522 B2 | 1/2004 | Rowe et al. |
| 6,718,551 B1 | 4/2004 | Swix et al. |
| 6,738,978 B1 | 5/2004 | Hendricks et al. |
| 6,756,997 B1 | 6/2004 | Ward, III et al. |
| 6,760,916 B2 | 7/2004 | Holtz et al. |
| 6,800,029 B2 | 10/2004 | Rowe et al. |
| 6,826,775 B1 | 11/2004 | Howe et al. |
| 6,850,252 B1 | 2/2005 | Hoffberg |
| 6,898,762 B2 | 5/2005 | Ellis et al. |
| 6,967,566 B2 | 11/2005 | Weston et al. |
| 7,100,183 B2 | 8/2006 | Kunkel et al. |
| 7,237,253 B1 | 6/2007 | Blackketter et al. |
| 7,249,321 B2 | 7/2007 | Bushey et al. |
| 7,266,835 B2 | 9/2007 | Halbert |
| 7,293,276 B2 | 11/2007 | Phillips et al. |
| 7,337,457 B2 | 2/2008 | Pack et al. |
| 8,166,498 B2 | 4/2012 | Walter |
| 8,282,476 B2 | 10/2012 | Walter |
| 8,317,618 B2 | 11/2012 | Malik |
| 8,365,218 B2 | 1/2013 | Walter et al. |
| 2001/0054134 A1 | 12/2001 | Nagatomo et al. |
| 2002/0069132 A1 | 6/2002 | Perkes et al. |
| 2002/0083464 A1 | 6/2002 | Tomsen et al. |
| 2002/0083469 A1 | 6/2002 | Jeannin et al. |
| 2002/0087402 A1 | 7/2002 | Zustak et al. |
| 2002/0132585 A1 | 9/2002 | Palermo et al. |
| 2002/0138561 A1 | 9/2002 | Chatfield et al. |
| 2002/0147984 A1 | 10/2002 | Tomsen et al. |
| 2002/0147988 A1 | 10/2002 | Nakano |
| 2002/0156870 A1 | 10/2002 | Boroumand et al. |
| 2003/0018969 A1 | 1/2003 | Humpleman et al. |
| 2003/0067554 A1 | 4/2003 | Klarfeld et al. |
| 2003/0070167 A1 | 4/2003 | Holtz et al. |
| 2003/0110171 A1 | 6/2003 | Ozer et al. |
| 2003/0110499 A1 | 6/2003 | Knudson et al. |
| 2003/0121051 A1 | 6/2003 | Howe et al. |
| 2003/0145323 A1 | 7/2003 | Hendricks et al. |
| 2003/0149975 A1 | 8/2003 | Eldering et al. |
| 2003/0159142 A1 | 8/2003 | Howe et al. |
| 2003/0163828 A1 | 8/2003 | Agnihotri et al. |
| 2003/0182567 A1 | 9/2003 | Barton et al. |
| 2003/0204847 A1 | 10/2003 | Ellis et al. |
| 2003/0208754 A1 | 11/2003 | Sridhar et al. |
| 2003/0233650 A1 | 12/2003 | Zaner et al. |
| 2003/0233656 A1 | 12/2003 | Sie et al. |
| 2003/0235407 A1 | 12/2003 | Lord |
| 2004/0003402 A1 | 1/2004 | McKenna, Jr. |
| 2004/0006509 A1 | 1/2004 | Mannik et al. |
| 2004/0045028 A1 | 3/2004 | Harris |
| 2004/0049785 A1 | 3/2004 | Grzeczkowski et al. |
| 2004/0098754 A1 | 5/2004 | Vella et al. |
| 2004/0108776 A1 | 6/2004 | Horng et al. |
| 2004/0111742 A1 | 6/2004 | Hendricks et al. |
| 2004/0122731 A1 | 6/2004 | Mannik et al. |
| 2004/0163101 A1 | 8/2004 | Swix et al. |
| 2004/0168188 A1 | 8/2004 | Bennington et al. |
| 2004/0194138 A1 | 9/2004 | Boylan, III et al. |

(56) References Cited

U.S. PATENT DOCUMENTS

| | | |
|---|---|---|
| 2004/0220858 A1 | 11/2004 | Maggio |
| 2004/0235567 A1 | 11/2004 | Chatani |
| 2004/0243470 A1 | 12/2004 | Ozer et al. |
| 2004/0243623 A1 | 12/2004 | Ozer et al. |
| 2004/0261127 A1 | 12/2004 | Freeman et al. |
| 2005/0021403 A1 | 1/2005 | Ozer et al. |
| 2005/0086688 A1 | 4/2005 | Omoigui |
| 2005/0091111 A1 | 4/2005 | Green et al. |
| 2005/0097599 A1 | 5/2005 | Plotnick et al. |
| 2005/0108776 A1 | 5/2005 | Carver et al. |
| 2005/0114906 A1 | 5/2005 | Hoarty et al. |
| 2005/0138668 A1 | 6/2005 | Gray et al. |
| 2005/0181878 A1 | 8/2005 | Danieli et al. |
| 2005/0196139 A1 | 9/2005 | Blackketter et al. |
| 2005/0204030 A1 | 9/2005 | Koch et al. |
| 2005/0204385 A1 | 9/2005 | Sull et al. |
| 2005/0216932 A1 | 9/2005 | Danker |
| 2005/0235318 A1 | 10/2005 | Grauch et al. |
| 2005/0251820 A1 | 11/2005 | Stefanik et al. |
| 2005/0262542 A1 | 11/2005 | DeWeese et al. |
| 2005/0267809 A1 | 12/2005 | Zheng |
| 2005/0267810 A1 | 12/2005 | Zheng |
| 2005/0267820 A1 | 12/2005 | Zheng |
| 2006/0010476 A1 | 1/2006 | Kelly et al. |
| 2006/0053049 A1 | 3/2006 | Nolan |
| 2006/0063590 A1 | 3/2006 | Abassi et al. |
| 2006/0068911 A1 | 3/2006 | Pirich et al. |
| 2006/0075430 A1 | 4/2006 | Park |
| 2006/0087987 A1 | 4/2006 | Witt et al. |
| 2006/0154710 A1 | 7/2006 | Serafat |
| 2006/0154725 A1 | 7/2006 | Glaser et al. |
| 2006/0190966 A1 | 8/2006 | McKissick et al. |
| 2006/0200842 A1 | 9/2006 | Chapman et al. |
| 2006/0294568 A1 | 12/2006 | Walter |
| 2006/0294572 A1 | 12/2006 | Walter |
| 2007/0067805 A1 | 3/2007 | Macrae et al. |
| 2007/0107035 A1 | 5/2007 | Howe et al. |
| 2007/0124763 A1 | 5/2007 | Ellis |
| 2007/0136773 A1 | 6/2007 | O'Neil et al. |
| 2007/0155506 A1 | 7/2007 | Malik |
| 2007/0157235 A1 | 7/2007 | Teunissen |
| 2007/0168884 A1 | 7/2007 | Weeks et al. |
| 2007/0186269 A1 | 8/2007 | Malik |
| 2007/0208766 A1 | 9/2007 | Malik |
| 2013/0012318 A1 | 1/2013 | Walter |
| 2013/0079129 A1 | 3/2013 | Walter et al. |

OTHER PUBLICATIONS

Bissell, R.A. et al "The Set-Top Box for Interactive Services", BT Technology J., vol. 13, No. 4, Oct. 1995.
Carey, John "Content and Services for the New Digital TV Environment".
Cauley, Leslie "Microsoft, Baby Bell Form Video Alliance", The Wall Street Journal, Sep. 26, 1994.
Chorianopoulos, Konstantinos, "The Digital Set-Top Box as a Virtual Channel Provider", Deptartment of Management Science and Technology, Athens University of Economics & Business Apr. 2003.
Dransfeld, Henning et al., "Interactive TV and Formula One: a strategic issue for engine suppliers", European Business Review, 1999.
Droitcourt, J.L., "Understanding How Interactive Television Set-Top Box Works . . . and What it will Mean to the Customer", International Broadcasting Convention, Sep. 14-18, 1995.
Elmer-Dewitt, Phillip, "Ready for Prime Time?", Time Archive, Dec. 26, 1994.
Elmer-Dewitt, Phillip, "Play . . . Fast Forward . . . Rewind . . . Pause U.S. Firms Want to Wire America for Two-Way TV, but their Systems Are Not Ready for Prime Time", Time Archive May 23, 1994.
Grant, Peter, "On-Demand TV Expands via Underused Fiber Highways", Wall Street Journal, Dec. 17, 2004.
Greenwald, John, "Battle for Remote Control", Time Archive, Mar. 1, 1995.
Hodge, Winston, "Architecture to deliver video on demand", Electronic Business Buyer, Nov. 1994.
Jain, Sanjay K. et al., "Video on Demand: An Overview", a Central University, Feb. 2003.
Keough, Christopher, "Interactive TV Connection-Technology-Gold Pocket Interactive acquires Mixed Signals Technologies—Brief Article", Los Angeles Business Journal, Mar. 4, 2002.
Knightrider TV Intro Theme, IMDb.com, Inc.
Leban, M. et al, "Internet search for TV content based on TV Anytime", Sep. 22-24, 2003.
Lin, Carolyn et al, "The influence of network branding on audience affinity for network television", Advertising Research Foundation Feb. 2004.
Loizides, Lydia "Interactive TV: Dispelling Misconceptions in the Media", Acm Computers in Entertainment, vol. 3, No. 1, Article 7a, Jan. 2005.
Mermigas, Diane, "NBC taking TV's future by the reins with on-demand content, delivery", Television Week, Sep. 15, 2003.
Short, David, "A quick guide to interactive television", Broadcasting Engineering, Feb. 2005.
Srivastava, H.O. et al., "On-Line Broadcast Archives for Interactive Video", IEEE Transactions on Broadcasting, vol. 43, No. 3, Sep. 1997.
Verhoeven, Jan L.M. et al., "System architecture for experimental interactive television", LogicaCMG Nederland B.V.
Waterman, David, "Internet TV: Business Models and Program Content", Dept. of Telecommunications Radio and TV Center Sep. 2001.
Zap2it.com: "TV Listings Frequently Asked Questions", http://web. Archive, org/web/20000903002526/www.zap2it.com/index/ 1,1146,_I_0_000.FF.html.
Zollman, Peter M. "Interactive Television".
"Building a Switched Broadcast Network", Access Intelligence LLC Nov. 16, 2005.
"Building Dynamic Content for Set-Top Boxes", Sun Microsystems 1994-2005.
"Building the perfect on demand beast: television on demand presents a dizzying array of technology options", Reed Business Information Nov. 3, 2003.
"Chips: Motorola's Scorpion chip turns TV into interactive information appliance", Work Group Computing Report Aug. 11, 1997.
"Columbia Tri-Star Television Distribution and Microsoft Sponsor Development Competition for Interactive Television", Microsoft Press Pass Jan. 25, 2000.
"EnReach Technology, Inc. Demonstrates Next Generation of Interactive Television with Innovative Open PVR Solution", EnReach Technology, Inc., PRNewswire.com, Sep. 1996-2006.
"Enter Video-on-Demand", Electronic News Aug. 31, 1998.
"Liberate Technologies Completes Assessment Aboard Scientific-Atlanta Explorer Set_Tops and Digital Interactive Network", Liberate Technologies Press May 2, 2002.
"Next-generation digital video network: intelligent IP infrastructure solutions for cable operators offering VoD services", Reed Business Information Feb. 2004.
"PBS Debuts Another First in Interactive Television; Wavexpress Selected to Provide Digital Broadcasting Platform", Market Wire Feb. 28, 2001.
"PENTV: BBC achieves significant interactive TV audiences with OpenTV", Aug. 13, 2001.
"Set-top survival", Electronics Weekly May 22, 2002.
"Successfully marketing television on demand: operators, programmers look to Drive VOD usage through promotions, improved navigation", Reed Business Information ISSN: 00072028, Nov. 22, 2004.
"Time Warner introduces world's first full service network in Orlando: Network offers First Digital Interactive Services including Movies on Demand, Home Shopping and Interactive Games", Business Wire Dec. 14, 1994.
"Video on the Move", Reed Business Information Aug. 14, 2000.
"Worldgate set to deliver 'GO!TV Links' for dynamic interactive TV", Advanstar Communications, Inc., Oct. 22, 2002.
http:/fwww.nintendo.com/consumer/downloads/wave_english.pdf.
Non-Final Office Action for U.S. Appl. No. 11/303,725 received from the United States Patent and Trademark Office (USPTO) mailed Dec. 11, 2007, 20 pages.

(56) References Cited

OTHER PUBLICATIONS

Final Rejection for U.S. Appl. No. 11/303,725 received from the United States Patent and Trademark Office (USPTO) mailed Sep. 4, 2008, 22 pages.

Non-Final Office Action for U.S. Appl. No. 11/303,725 received from the United States Patent and Trademark Office (USPTO) mailed Jan. 16, 2009, 22 pages.

Final Rejection for U.S. Appl. No. 11/303,725 received from the United States Patent and Trademark Office (USPTO) mailed May 27, 2009, 21 pages.

Non-Final Office Action for U.S. Appl. No. 11/303,725 received from the United States Patent and Trademark Office (USPTO) mailed Sep. 15, 2009, 46 pages.

Final Rejection for U.S. Appl. No. 11/303,725 received from the United States Patent and Trademark Office (USPTO) mailed Mar. 1, 2010, 20 pages.

Non-Final Office Action for U.S. Appl. No. 11/303,725 recieved from the United States Patent and Trademark Office (USPTO) mailed Mar. 8, 2012, 28 pages.

Notice of Allowance for U.S. Appl. No. 11/303,725 received from the United States Patent and Trademark Office (USPTO) mailed Jul. 24, 2012, 29 pages.

SYSTEM, METHOD AND COMPUTER PROGRAM FOR ENABLING AN INTERACTIVE GAME

CROSS-REFERENCE TO RELATED APPLICATIONS

The present application is a continuation of, and claims priority from, U.S. patent application Ser. No. 11/303,725, filed on Dec. 15, 2005 and entitled "SYSTEM, METHOD AND COMPUTER PROGRAM FOR ENABLING AN INTERACTIVE GAME," the contents of which are hereby incorporated by reference in their entirety.

BACKGROUND

Computer games are a very popular form of contemporary entertainment. Many conventional computer games enable participant interaction using a pointing device, keyboard, joystick or similar input devices associated with a computer or specialized controllers which are part of a game apparatus. Often game participation is limited by the availability of a desired number of these specialized controllers and multiple use input devices.

To overcome this limitation, some conventional systems include multiple ports for coupling specialized controllers to a game apparatus. Generally, a limited number of controller ports are provided and game providers typically include no more than two specialized controllers with the game apparatus. Thus, those who wish to take advantage of the available controller ports must purchase or otherwise obtain additional controllers. Other conventional computer games permit a keyboard to be shared. These computer games designate specific keys on a keyboard for receiving input commands from respective participants.

Both of these conventional approaches have shortcomings. Systems having multiple controller ports often have no mechanism for supporting a number of participants greater than the number of controller ports. Systems that share a single keyboard coupled to a computer are problematic because the keyboard cannot always be positioned between multiple game participants in a manner that is comfortable for each participant. Moreover, each participant is limited to a specific location.

Accordingly, despite the development of multiple approaches to include more than one participant in a computer game there is still a need for improved approaches for enabling participants to play a game.

SUMMARY

Embodiments of a system comprise a monitor, a processor, a first controller, a game server and a wireless communication device. The monitor is configured to receive audio and video content having associated therewith an indicator that alternative content is available. The processor presents the audio and video content for display on the monitor. The first controller is used to establish a communication session with the game server to communicate a request to start a game. In response, the game server communicates a unique identifier. The game server then registers one or more wireless communication devices that communicate the unique identifier. The user interface of each respective wireless communication device is used thereafter as a data controller by participants of the game.

In a particular embodiment, an apparatus (e.g., a set top box) includes a processor and a memory storing executable by the processor to perform operations including sending content of a first channel to a display device and receiving a callback address from a game server. The operations also include sending an image that corresponds to the callback address to the display device and storing information associated with a first channel being displayed when the image is sent to the display device. The operations further include sending a game setup menu to the display device and sending (e.g., after the game setup menu terminates) the content of the first channel to the display device based on the stored information associated with the first channel.

In another particular embodiment, a method includes receiving, at a game server, first commands from a set top box via a first network, where the set top box is located at a first location and where the first commands are associated with a game instance of a particular game. The method also includes receiving, via a second network that is different from the first network, second commands associated with the game instance from a wireless device that is located at a second location that is remote from the first location. The method further includes receiving a first request at the game server to pause the game instance and receiving a second request at the game server to resume the game instance when the wireless device has relocated from the second location to the first location. The method includes, after resuming the game instance, receiving the first commands from the set top box and third commands from the wireless device via the first network.

In another particular embodiment, a computer readable tangible medium includes instructions executable by a processor to perform a method. The method includes receiving a request via a first network for a game instance, the request received from a set top box. The request includes first identification information associated with a first player collocated with the set top box and second identification information of a wireless device associated with a second player remotely located from the set top box. The method also includes starting the game instance. The method further includes receiving commands associated with the game instance from a controller of the first player via the first network and receiving commands associated with the game instance from the wireless device via a second network that is different than the first network. The method includes detecting an interruption of the game instance. The method also includes retrieving information identifying an alternative controller associated with a particular game player and resuming the interrupted game instance based on the retrieved information.

Other systems, methods, features and advantages will be or will become apparent to one with skill in the art upon examination of the following figures and detailed description. All such additional systems, methods, features and advantages are defined and protected by the accompanying claims.

BRIEF DESCRIPTION OF THE DRAWINGS

The systems, methods and computer programs can be better understood with reference to the following figures. The components within the figures are not necessarily to scale, emphasis instead being placed upon clearly illustrating the principles for enabling an interactive game. Moreover, in the figures, like reference numbers designate corresponding parts throughout the different views.

DETAILED DESCRIPTION

Embodiments of the present system, method and computer program enable an interactive game. A game server, in response to a user request, provides a unique identifier associated with an instance of the interactive game. The game server forwards one or more invitations to join the interactive game in accordance with the user request. Thereafter, the game server registers one or more wireless communication devices to be used as data controllers by players who elect to join the game.

The integration of available entertainment, communication and data networks is leveraged to provide select multimedia content to a specified viewing device. U.S. Pat. No. 5,818,438 (the '438 patent), the contents of which are incorporated by reference herein, discloses a system and method that provides an identifying code or interactive callback address along with information for directly invoking alternative multimedia content. A user of the system and method disclosed in the '438 patent can establish a session with a game server using the interactive callback address and other information and upon completion of the session, re-tune or select the original content for viewing.

The game server associates this identifying code or interactive callback address with a location at which the presently viewed programming or application will be stored. The identifying code or interactive callback address may be a program-specific code that can be used by hosts or subscribers to invoke one or more programs to configure an interactive game. Alternatively, the identifying code may be a common identifying code or interactive callback address, used by all subscribing viewers to access a setup program, or an application-specific identifying code or interactive callback address, which is in turn used to invoke a setup program on the game server.

Hosts or subscribers are provided with a set top box or similar device adapted to be coupled to a multimedia-distribution network to which one or more service provider systems are also coupled and a suitable display device, such as a television monitor, a computer, etc. The set top box includes a receiving set capable of receiving broadband signals over the multimedia-distribution network. The set top box is configured to detect the presence and content of an identifying code or interactive callback address received by the receiving set either in a program signal (an in-band signal) or in an out-of-band signal. The set top box is also configured to store the identity of the source or channel on which the presently viewed programming is being received in one or more storage devices. The set top box is also configured to detect and store information accompanying the transmission of the identifying code or interactive callback address regarding an image to be displayed on the display device (such as a "key" or "icon") or an audio message to be reproduced to indicate the availability of content, such as an interactive application, from the game server. Alternatively, such information regarding the image to be displayed or the message to be reproduced may be pre-stored in an appropriate storage device to which the set top box is coupled. The set top box is also coupled to a processor configured to generate a video image based on the received or pre-stored "key" or "icon" information, or alternatively, is programmed to generate the video signal and is coupled to the display device in such a manner as to provide such a signal to that device.

Furthermore, the set top box is adapted to establish communication over the multimedia distribution network with the game server, upon receiving a request from the host or subscribing viewer in response to seeing the "icon" or hearing the message. The processor may first store in the information storage device the identity of the channel on which the program then being viewed is being transmitted. A communication session over a network to the game server is then established by transmitting a message including the identifying code or interactive callback address. If the identification code or interactive callback address is a common identification code (for example, a "well-known callback address") the game server returns the program- or application-specific identification code or interactive callback address, which the set top box then may use to invoke from the game server an appropriate setup or configuration program.

The game server transmits to the set top box the identity of a network service (i.e., a network address) or a channel on which the requested program and later game information will be provided, and the set top box initiates a session with the indicated network service and/or causes the receiving set to tune to the channel. The set top box then receives the program and later game information from the game server. During that session, communication between the set top box and the game server may be two-way.

A setup program directs the host in identifying the game and the participants or players. The setup program may be configured to prompt the host for information regarding each of the players and a respective wireless communication device that each player will use to communicate with the game server to play the game. Otherwise, the setup program will simply prompt the host for contact information associated with potential players. In turn, the game server generates a unique identifier that is associated with a particular instance of the game and contacts each of the players via a wireless communication device to confirm the potential player's desire to participate and to receive information regarding the wireless communication device that will be used to communicate with the game server during the game.

One or more communication sessions or channels remain open while the players interact with the game server to play the game. Players located within view of the host's display device may communicate with the game server via a short-range wireless network, the set top box and one or more links between the set top box and the game server. Alternatively, these local players can communicate with the game server via a wireless data network. Local players receive game content from the game server via the host's display device or via a display device integrated with their respective wireless communication device. Local players generate game commands using the user interface of their respective wireless communication devices. Players removed from the host (not within view of the host's display device) can be contacted and invited to join the game. Such a player forwards the unique identifier, a user name, and information identifying their wireless communication device to the game server. Game content is provided to remote players via a wireless data network. Similarly, game commands are generated using the user interface of the wireless communication device and communicated back to the game server via the wireless data network.

When the setup program is terminated and game play is not desired or when the host signals the set top box that interactive game is no longer desired, the communication session(s) with the game server associated with the particular instance of the game are terminated. The set top box then retrieves the identity of the first program from the information storage device, and causes the receiving set to re-tune to the first program to which the hosts viewing device had been tuned.

Figure 1:
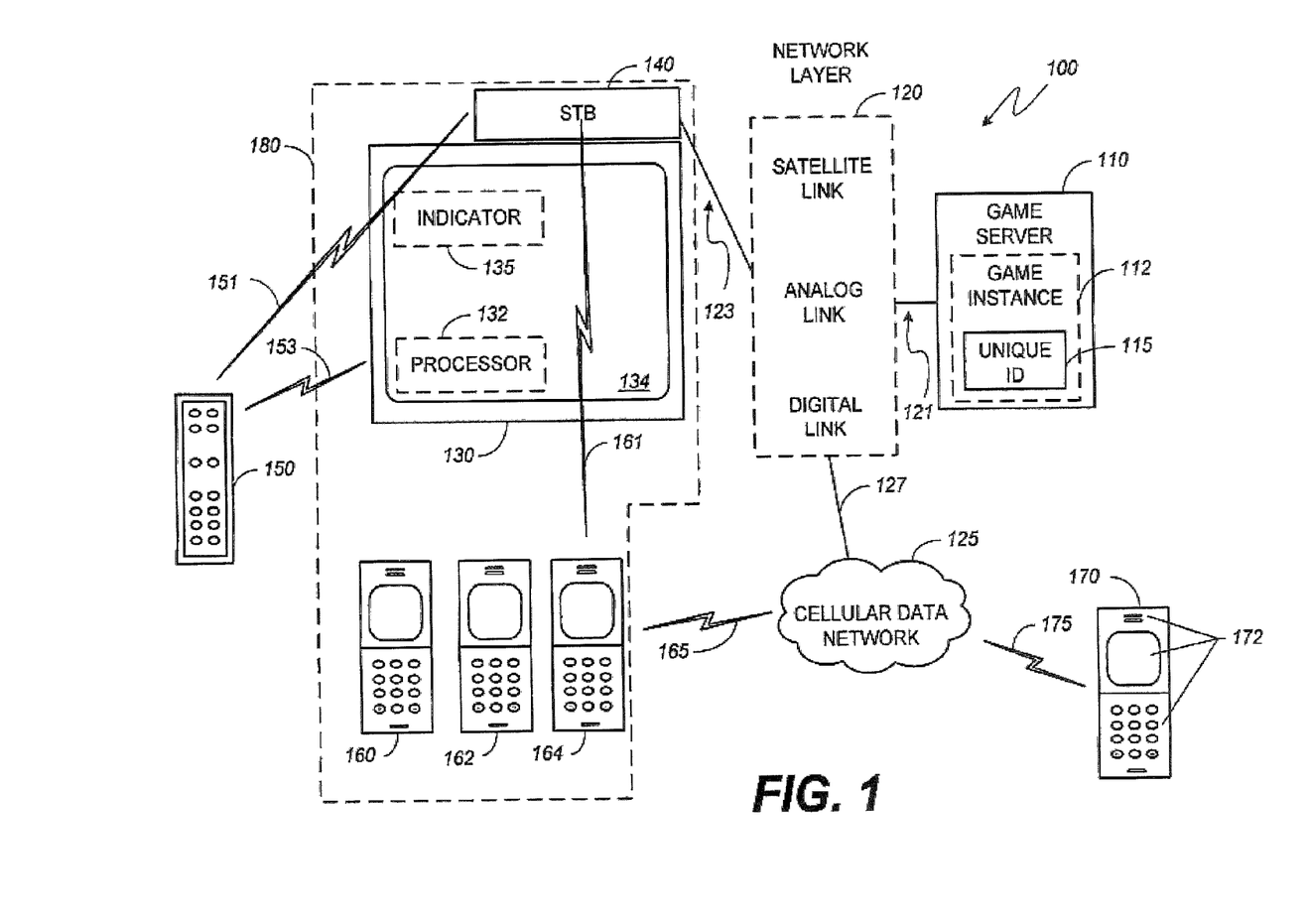
FIG. 1 is a block diagram illustrating an embodiment of a game environment.

Having generally described the present system, method and computer program for enabling an interactive game, various additional embodiments will be described with respect to FIGS. 1-5. By way of example, FIG. 1 is a block diagram illustrating an embodiment of a game environment 100. Game environment 100 includes a short-range wireless or home network 180 that is communicatively coupled to game server 110 via a network layer 120. The short-range wireless network 180 is configured to support network connectivity of portable devices and complies with one or more wireless network protocols, such as but not limited to the Institute of Electrical and Electronics Engineers 802.11 and 802.15 protocols and the Bluetooth protocol for home or local area wireless networks.

Figure 2:
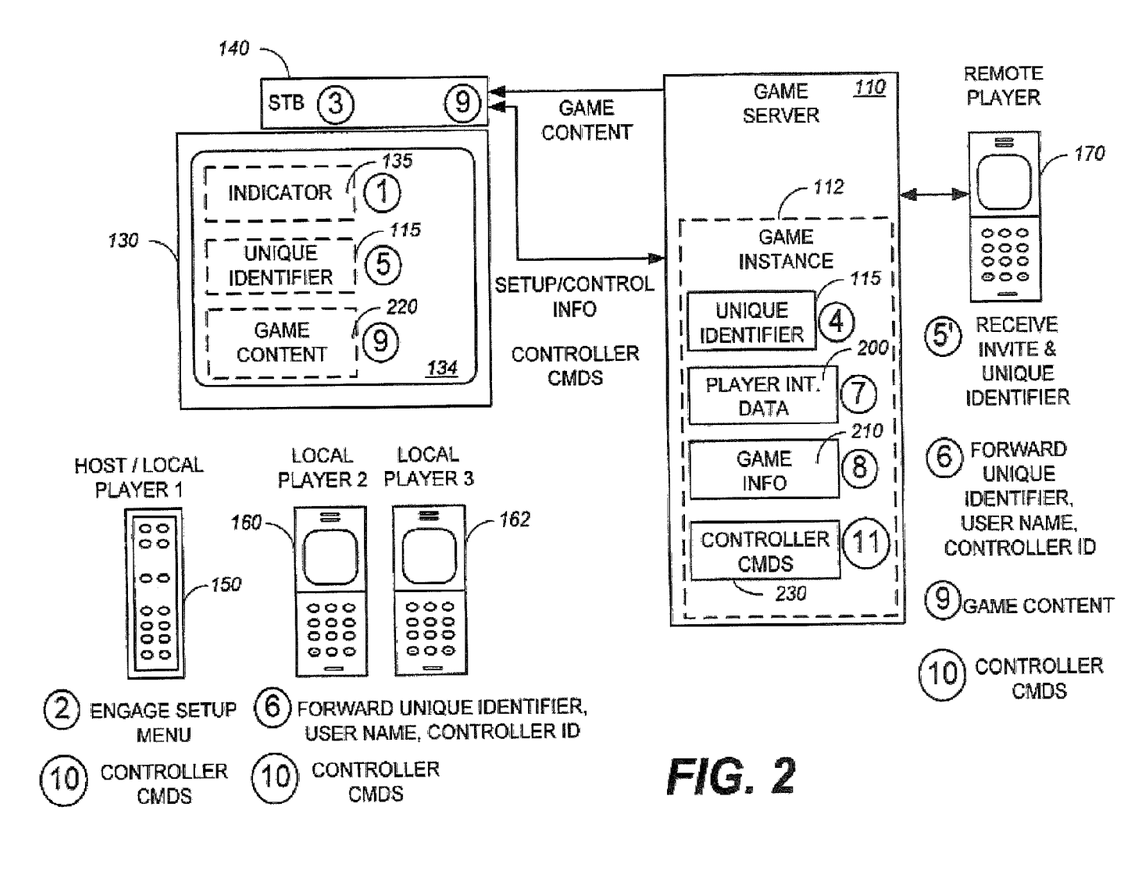
FIG. 2 is a schematic diagram illustrating game setup and operation in the game environment of FIG. 1.

Short-range wireless network 180 includes set top box 140 and one or more wireless communication devices, such as wireless communication device 160, wireless communication device 162 and wireless communication device 164. Set top box 140 communicates with one or more network layer 120 content transfer mediums via communication link 123. In addition, short-range wireless links communicatively couple set top box 140 with wireless communication devices, such as wireless link 161, which couples set top box 140 and wireless communication device 164. Moreover, set top box 140 is coupled to monitor 130 and processor 132, which converts various signals received via communication link 123 and network layer 120 to present multimedia content to viewers in close proximity to display 134. In the illustrated embodiment, set top box 140 is a separate device. The set top box 140 could be integrated or otherwise combined with monitor 130 or some other device such as a gaming console (not shown). For that matter, the gaming console could be combined or integrated with monitor 130. As described above and in the '438 patent, one or more indicators, such as indicator 135 is integrated within the various signals communicated via set top box 140 to indicate that game server 110 is available to provide alternative content.

As indicated in FIG. 1, controller 150 is wirelessly coupled to set top box via communication link 151 and wirelessly coupled to monitor 130 via communication link 153. A game host or subscriber of one or more multimedia services delivered via set top box 140 directs the operation of set top box 140 and monitor 130 via multiple function controller 150.

Game server 110 communicates with one or more network layer 120 content transfer mediums via communication link 121. Game server 110 is configured to provide one or more interactive games to local players within home network 180. Game instance 112 stored within game server 110 includes information that supports the generation of game content, which is communicated via network layer 120 and set top box 140 on its way to monitor 130. Game instance 112 further includes a unique identifier 115, which is used to bind set top box 140 and each of the wireless communication devices, such as wireless communication device 160, wireless communication device 162, and wireless communication device 164 to the interactive game. Upon the completion of a setup procedure that is illustrated in FIG. 2 and explained in detail below, game instance 112 includes information that maps select items of the user interface of each respective wireless communication device for use as a game input. In this way, multiple players can enjoy an interactive multi-player game without the need of specialized game controllers or being in close proximity to the host's home network.

In one alternative embodiment, one or more select items of the user interface of controller 150 are registered to enable the host or an additional player without a wireless communication device to join the game. In this mode of operation, other items of the user interface of controller 150 remain operable to communicate with set top box 140 and monitor 130 to control these devices.

As further illustrated in FIG. 1, a remote wireless communication device 170 (i.e., not within home network 180) is communicatively coupled to network layer 120 via cellular data network 125, communication link 127 and wireless data link 175. User interface 172 associated with wireless communication device 170 can also be registered or bound to game instance 112 via unique identifier 115. In this way, an operator of remote wireless communication device 170 can be contacted, invited to join and added to the game.

Alternatively, one or more of the local wireless communication devices can be coupled to cellular data network 125 via communication link 165 to directly or indirectly contact the operator of remote wireless communication device 170. For example, one or more of a text message, a multimedia message, a voice message or a phone call can be communicated to invite the operator of remote wireless communication device 170 to join the game. These messages will include the unique identifier and perhaps additional information that can be used by the operator to communicate with game server 110 to join the game.

While the embodiment illustrated in FIG. 1 includes wireless telephonic devices (i.e., cellular telephones), it should be understood that wireless communication devices with various user interfaces, such as personal digital assistants (PDAs), combination devices, wireless computing devices, etc. can be interchanged with one or more of the wireless communication devices to communicate with game server 110.

FIG. 2 is a schematic diagram illustrating game setup and operation in the environment of FIG. 1. The schematic diagram includes a sequence of encircled numbers from 1 through 11 that are indicative of an example sequence of actions, events and information transfers that occur during the setup and operation of an interactive game. As described above and noted by the encircled number "1," game server 110 and/or set top box 140 are configured to work in conjunction with monitor 130 to present indicator 135 on display 134.

In response to the indicator 135, a host or subscriber of a game service uses a wireless controller 150 configured to communicate with monitor 130 and set top box 140 to engage a setup menu. The setup menu can be software and/or firmware stored and operative on set top box 140. Alternatively, the setup menu can be hosted in game server 110. The host, via the setup menu, identifies a game, a number of proposed players and provides information about controller 150, when it is desired to have controller 150 serve as both a host controller and as a game controller. In addition, the host may provide contact information associated with one or more remote players. A remote player communicates with game server 110 via wireless communication device 170 and a wireless data network different from the short-range wireless network used by the host and local players. Moreover, the host may provide additional information via the setup menu about a first local player, a respective wireless communication device 160 and a second local player with wireless communication device 162. The above described activities of the host communicating with game server 110 via controller 150 are noted by the encircled number "2."

The encircled number "3" indicates that game; player; contact; and controller information collected during execution of the setup menu are communicated from set top box 140 to game server 110. Alternatively, the set top box 140 or game server 110 may have stored contact information associated with remote or local users that have been invited to previous games. Information associated with the previous invitation or previously game instances can be used to assist the setup menu in configuring a particular game instance.

As indicated by the encircled number "4," game server 110 in turn initiates a game instance 112, which includes unique identifier 115. Unique identifier 115 is transmitted from game server 110 to display 134 via set top box 140. As noted by the encircled number "5," the host and local players can observe unique identifier 115 in the video information presented in display 134 and/or hear a message that includes the unique identifier. Encircled number "5" indicates that game server 110 forwards an invitation to join the game to a potential remote player via wireless communication device 170. The invitation can be made via a short-message service (SMS) or multimedia-message service (MMS) message provided over a wireless data network. The invitation includes the unique identifier 115. Alternatively, the wireless communications device 170 may also be able to initiate a request to join the game by entering a SMS, MMS, hypertext transfer protocol (HTTP), or other address associated with game instance 112 on game server 110. In this way, a remote user can attempt to join a game in progress from anywhere where the remote user, through wireless communication device 170 can be communicatively coupled to game server 110. In turn, game server 110 will communicate information about the remote user to set top box 140, which may present a notice on monitor 130 introducing the remote user or a request for the host to allow the remote user to enter the game.

Thereafter, as indicated by the encircled number "6," each of the potential local and remote players communicates the unique identifier 115, a user name and information about their respective wireless communication devices to game server 110. The encircled number "7" indicates that game server 110 stores player interface data 200 in game instance 112. Player interface data 200 is derived from a description of the user interface on each respective player's wireless communication device and is used throughout the existence of game instance 112 to process command inputs from each of the players. Game server 110 forwards information on game operation and navigation via each specific wireless communication device registered with game instance 112. Game server 110 communicates this information once the identity of each registered wireless communication device is determined. To assist users in configuring a particular game, game server 110 or set top box 140 is provided a database of popular wireless communication devices including photographs or graphical images representing different devices. In some embodiments, the setup menu presents images grouped by manufacturer for users to easily identify their respective wireless communication device. In return, game server 110 or set top box 140 provides one or more images describing how the various items on each user interface is used to enter specific game commands.

Having been provided with information from the setup menu as well as information about each of the respective devices that will be used to interact with game instance 112, game server generates game information 210 as shown by the encircled number "8." Game information 210 is used by game logic to coordinate the generation and transmission of game content 220 to set top box 140 for presentation on display 134 and presentation via the user interface (i.e., a separate display) on wireless communication device 170, as indicated by the encircled number "9." Thereafter, as indicated by the encircled number "10," each of the respective players transmits various controller commands 230 in accordance with play of the interactive game, which are communicated back to and temporarily buffered within game instance 112 of game server 110, as indicated by the encircled number "11." Game server 110 or set top box 140 is further configured to pause and restart or otherwise continue an interrupted game. Game server 110 or set top box 140 has the ability to choose how each player is invited to connect to a game instance 112 that is about to be restarted or continued in accordance with a host controllable connectivity configuration. For example, game instance 112 may be paused while a remote player is in transit from a remote location to the host's local network. If the remote player was using a cellular telephone to connect with game server 110 and desires to switch from connectivity via a wireless data network to connectivity via the host's local network, game instance 112 retains a record of the remote player's username and cellular telephone number to enable the remote player to continue under the new connectivity situation within the stored game. In addition, game server 110 and set top box 140 have the ability to store information identifying a number of alternative controllers and connectivity configurations for a particular player should the information be needed to configure a continuation of an interrupted game or to configure a new game.

Figure 3:
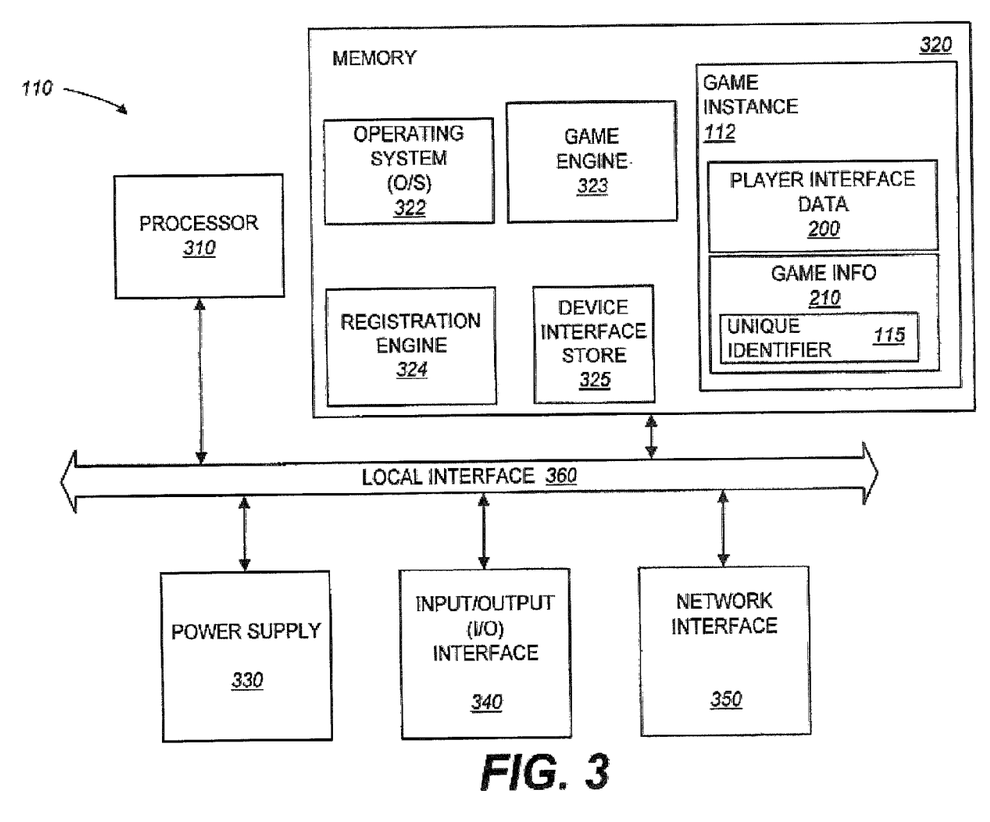
FIG. 3 is a block diagram illustrating an embodiment of the game server of FIG. 1.

FIG. 3 is a block diagram illustrating an embodiment of the game server 110 of FIG. 1 and FIG. 2. Generally, in terms of hardware architecture, game server 110 includes processor 310, memory 320, power supply 330, input/output (I/O) interface 340 and network interface 350. Processor 310, memory 320, power supply 330, I/O interface 340 and network interface 350 are communicatively coupled via local interface 360. Local interface 360 can be, for example but not limited to, one or more buses or other wired or wireless connections, as is known in the art. Local interface 360 may have additional elements, which are omitted for simplicity, such as controllers, buffers (caches), drivers, repeaters, and receivers, to enable communications. Further, local interface 360 may include address, control, and/or data connections to enable appropriate communications among the aforementioned components.

Power supply 330 provides power to each of the processor 310, memory 320, I/O interface 340, network interface 350 and local interface 360 in a manner understood by one of ordinary skill in the art.

Processor 310 is a hardware device for executing software, particularly that stored in memory 320. The processor 310 can be any custom made or commercially available processor, a central processing unit (CPU), an auxiliary processor among several processors associated with the game server 110, a semiconductor based microprocessor (in the form of a microchip or chip set), or generally any device for executing software instructions.

The memory 320 can include any one or combination of volatile memory elements (e.g., random-access memory (RAM, such as dynamic random-access memory (DRAM), static random-access memory (SRAM), synchronous dynamic random-access memory (SDRAM), etc.) and non-volatile memory elements (e.g., read-only memory (ROM), hard drive, tape, compact disc read-only memory (CDROM), etc.). Moreover, the memory 320 may incorporate electronic, magnetic, optical, and/or other types of storage media. Note that the memory 320 can have a distributed architecture, where various components are situated remote from one another, but can be accessed by the processor 310.

The software in memory 320 may include one or more separate programs, each of which comprises an ordered listing of executable instructions for implementing logical functions in addition to identified locations for data storage. In the example of FIG. 3, the software in the memory 320 includes operating system 322, game engine 323 and registration engine 324. The operating system 322 essentially controls the execution of other programs, such as game engine 323 and registration engine 324 and provides scheduling, input-output control, file and data management, memory management, and communication control and related services.

Registration engine 324 includes logic configured to complete the necessary steps to identify a desired game, initiate game instance 112, generate, associate and communicate unique identifier 115 with the game instance 112. In addition, registration engine 324 includes logic configured to generate one or more invitations, identify and associate players that communicate unique identifier 115 with game instance 112 and establish appropriate game content links. Moreover, registration engine 324 includes logic configured to work in conjunction with information in device interface store 325 to map and communicate the assignment of appropriate elements of a player's respective wireless communication device interface with game commands. Player information generated as a result of the execution of logic within registration engine 324 may be collected and stored within player interface data 200.

Game engine 323 includes logic for receiving game commands (i.e., inputs) from one or more players as identified within player interface data 200 and applying the same in accordance with the rules of an identified game. In turn, game engine 323 generates game information 210, which is stored within game instance 112. Moreover, game engine 323 includes logic for generating game content in a format or formats suitable for local and remote players. In the case of local players, game content may be in the form of audio, video or both audio and video suitable for display and presentation via monitor 130. In the case of remote players, game content will be formatted for display and presentation on the player's wireless communication device.

Game engine 323 and registration engine 324 are source programs, executable programs (object code), scripts, or any other entities comprising a set of instructions to be performed. When implemented as source programs, the programs are translated via a compiler, assembler, interpreter, or the like, which may or may not be included within the memory 320, so as to operate properly in connection with the O/S 322. Furthermore, game engine 323 and registration engine 324 can be written in one or more object-oriented programming languages, which have classes of data and methods, or procedure programming languages, which have routines, subroutines, and/or functions.

I/O interface 340 is a hardware device for communicatively coupling local input devices, for example but not limited to, a keyboard, mouse, scanner, microphone, etc. Furthermore, I/O interface 340 communicatively couples local output devices, for example but not limited to, a printer, display, etc. These local I/O devices may be provided to configure and maintain game server 110 as desired.

Network interface 350 is a hardware device for communicatively coupling set top box 140 and one or more wireless communication devices to game server 110 via various wired and wireless networks. In this regard, network interface 350 may include devices that communicate both inputs and outputs, for instance but not limited to, a modulator/demodulator (modem; for accessing another device, system, or network), a radio frequency (RF) or other transceiver, a telephonic interface, a bridge, a router, etc.

Network interface 350 exposes game server 110 to wired and wireless data networks, including but not limited to, community access television (CATV) distribution networks, satellite broadcast networks, public switched telephone network (PSTN) based communication services, DSL, and cellular data networks. Accordingly, network interface 350 is configured to perform the signal conditioning and format conversions to communicate data through network layer 120 (FIG. 1). Under some circumstances, signal conditioning and format conversions include the performance of a variety of functions including, for example: answering a phone line; hanging-up a phone line; dialing a phone number; sending data signals; receiving data signals; generating dual tone multi-frequency (DTMF) tones; detecting DTMF tones; receiving automatic number identification—the number from which a caller initiates a call (ANI) and dialed number identification service—the number dialed by the caller (DNIS) playing voice messages; and converting voice signals between analog and digital formats. Under some other circumstances, signal conditioning and format conversions include encoding and encapsulating data in packets under one or more protocols including transmission control protocol/Internet protocol (TCP/IP), among others.

When game server 110 is in operation, the processor 310 is configured to execute software stored within the memory 320, to communicate data to and from the memory 320, and to generally control operations of the game server 110 pursuant to the software and data elements. Game engine 323, registration engine 324 and the O/S 322, in whole or in part, but typically the latter, are read by the processor 310, perhaps buffered within the processor 310, and then executed.

When game engine 323 and registration engine 324 are implemented in software, as is shown in FIG. 3, it should be noted that these software elements can be stored on any computer-readable medium for use by or in connection with any computer related system or method. In an alternative embodiment, where one or more of the game engine 323 and registration engine 324 are implemented in hardware, the game engine 323 and registration engine 324 can implemented with any or a combination of the following technologies, which are each well known in the art: a discrete logic circuit(s) having logic gates for implementing logic functions upon data signals, an application-specific integrated circuit (ASIC) having appropriate combinational logic gates, a programmable gate array(s) (PGA), a field-programmable gate array (FPGA), etc.

Figure 4:
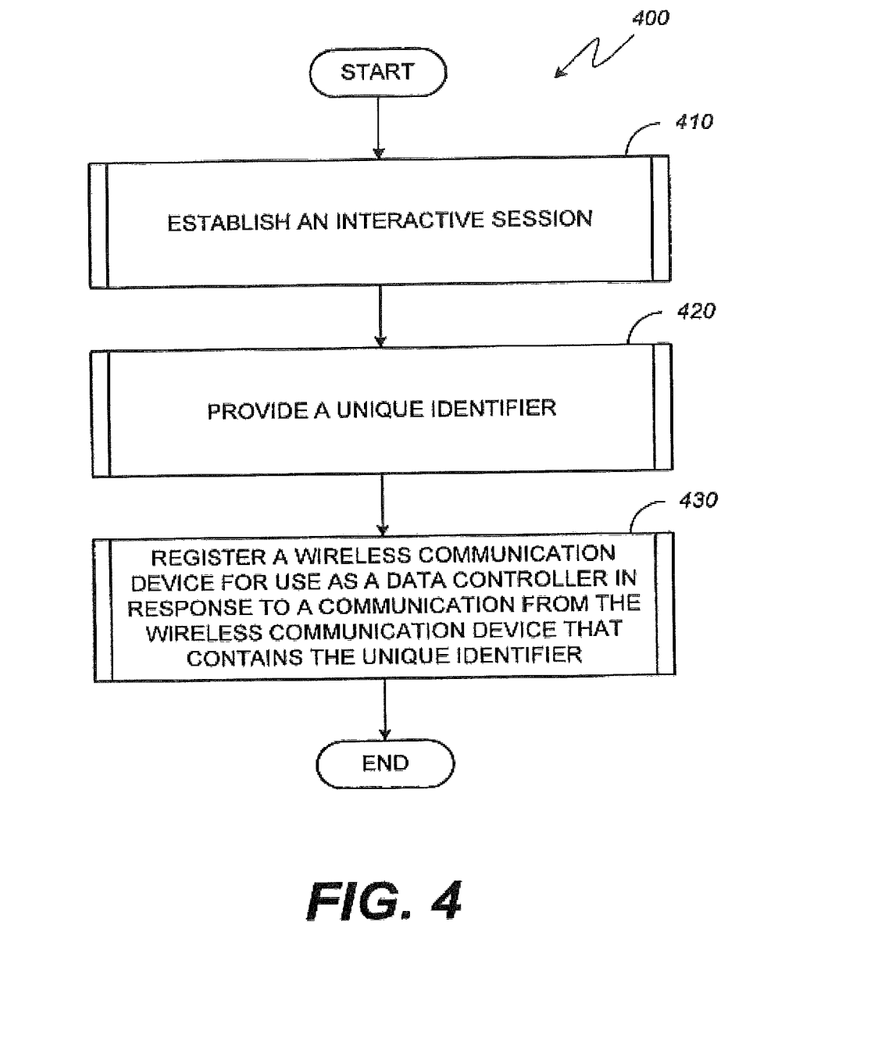
FIG. 4 is a flow diagram illustrating an embodiment of a method for enabling an interactive game.

FIG. 4 is a flow diagram illustrating an embodiment of a method 400 for enabling an interactive game. In this regard, each block represents a specified step or function. When embodied in software and/or a hardware device, each block represents a module, segment, or portion of code, which comprises one or more executable instructions for implementing the specified function(s). Method 400 begins with block 410 where an interactive session is established. In block 420, a unique identifier is provided. Thereafter, as shown in block 430 a wireless communication device is registered for use as a data controller in response to a communication from the wireless communication device that contains the unique identifier.

Figure 5:
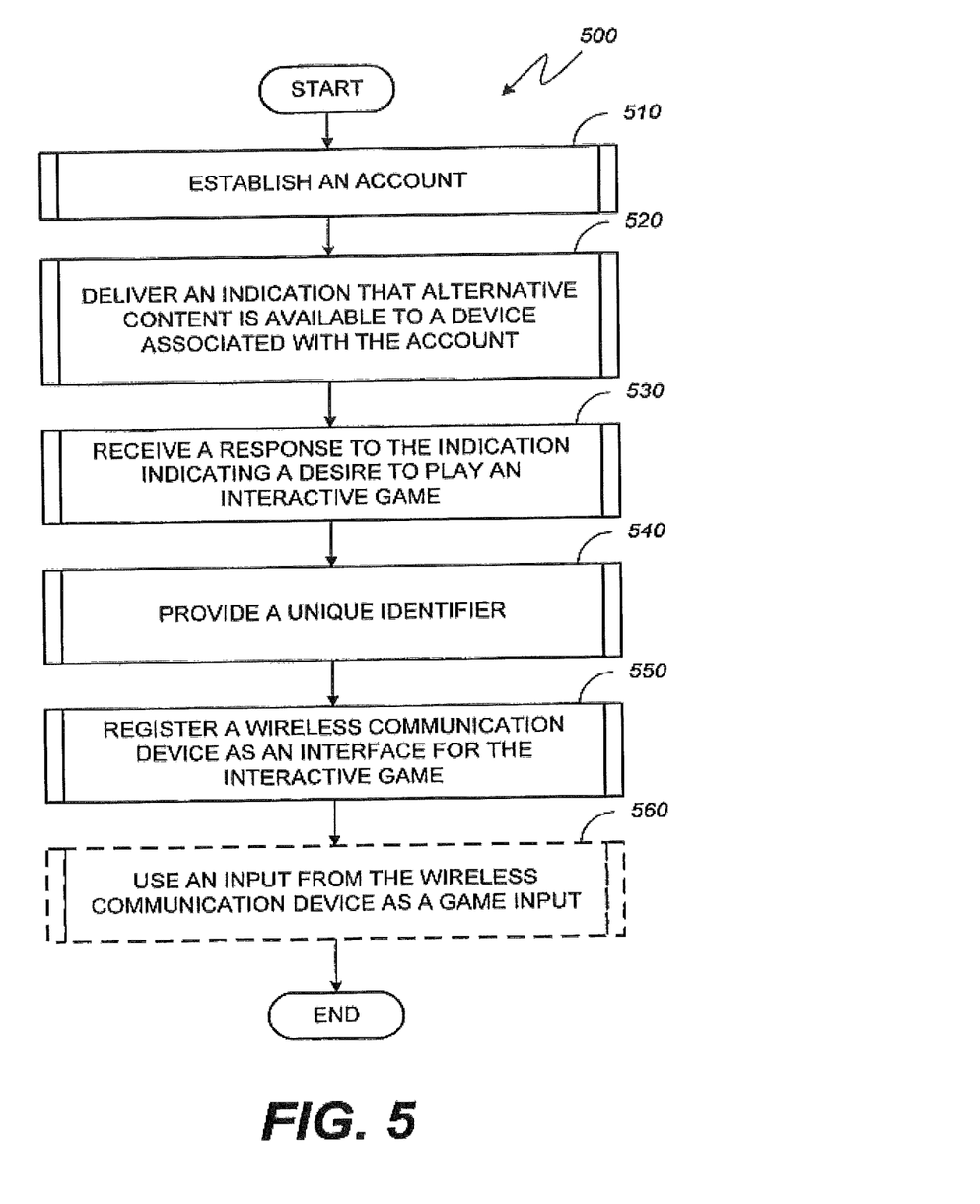
FIG. 5 is a flow diagram illustrating an embodiment of a computer program operative on the game server of FIG. 1.

FIG. 5 is a flow diagram illustrating an embodiment of a computer program that can be executed on the game server 110 of FIG. 1. The flow diagram of FIG. 5 shows the architecture, functionality, and operation of a possible implementation via software and or firmware associated with the game server 110 introduced in FIG. 1. In this regard, each block represents a module, segment, or portion of code, which comprises one or more executable instructions for implementing the specified function(s). Computer program 500 begins with block 510 where an account is established. In block 520, computer program 500 directs game server 110 to deliver an indication that alternative content is available to a device associated with the account. Thereafter, as shown in block 530, computer program 500 receives a response to the indication indicating a desire to initiate an interactive game. In turn, computer program 500 provides a unique identifier, as indicated in block 540. Next, as shown in block 550, game server 110 under the direction of computer program 500, registers a wireless communication device as an interface for the interactive game. As illustrated in block 560, game server 110 uses an input entered via the user interface on the wireless communication device as a game input.

Operational software programs that may be used by game server 110, as well as operational software that may be used in conjunction with controllers, browsers, monitors, computers, telephonic devices, among other devices that interface with system 100, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a RAM, a ROM, an erasable programmable read-only memory (EPROM or Flash memory) (magnetic), an optical fiber (optical), and a portable CDROM (optical). Note that the computer-readable medium could even be paper or another suitable medium upon which the program is printed and the program can be electronically captured, via for instance, optical scanning of the paper or other medium, then compiled, interpreted or otherwise processed in a suitable manner if necessary, and then stored in a computer memory.

While various embodiments of the system, method and computer program for enabling an interactive game have been described, it will be apparent to those of ordinary skill in the art that many more embodiments and implementations are possible that are within the scope of the accompanying claims. Accordingly, the system, method and computer program for enabling an interactive game are not to be restricted beyond the attached claims and their equivalents.

What is claimed is:

1. An apparatus, comprising:
  a processor; and
  a memory storing instructions that are executable by the processor to perform operations comprising:
    sending content of a first channel to a display device;
    receiving a callback address from a game server;
    sending an image that corresponds to the callback address to the display device;
    storing information associated with the first channel when the image is sent to the display device;
    sending content associated with a game to the display device; and
    sending the content of the first channel to the display device based on the stored information associated with the first channel.

2. The apparatus of claim 1, wherein the content associated with the game includes a game setup menu, and wherein the operations further comprise sending the content of the first channel based on the stored information after the game setup menu terminates.

3. The apparatus of claim 1, wherein the operations further comprise sending content of a second channel associated with the game to the display device.

4. The apparatus of claim 1, wherein the operations further comprise sending an identifier and information regarding a controller useable to participate in the game to the game server.

5. The apparatus of claim 4, further comprising a network interface coupled to a first network, wherein the identifier enables a player to join the game via a second network that is different from the first network.

6. The apparatus of claim 4, wherein the operations further comprise receiving the identifier from each of a plurality of players, and sending commands associated with the game received from each of the plurality of players to the game server.

7. The apparatus of claim 1, wherein the operations further comprise receiving, from the game server, visual representation data associated with the game.

8. The apparatus of claim 1, further comprising a network interface configured to communicate with at least one controller via a short-range radio-frequency link.

9. The apparatus of claim 1, further comprising a network interface configured to receive game commands associated with play of a particular game from a wireless phone.

10. A method comprising:
  receiving, at a game server, first commands from a set top box via a first network, wherein the set top box is located at a first location and wherein the first commands are associated with a game instance of a particular game;
  receiving, via a second network that is different from the first network, second commands associated with the game instance from a wireless device that is located at a second location that is remote from the first location;
  receiving a first request at the game server to pause the game instance;
  receiving a second request at the game server to resume the game instance when the wireless device has relocated from the second location to the first location;
  resuming the game instance at the game server; and
  after resuming the game instance, receiving the first commands from the set top box and third commands from the wireless device via the first network.

11. The method of claim 10, further comprising sending visual representation data associated with the game instance to the set top box.

12. The method of claim 11, wherein the set top box sends visual representations based on the visual representation data to a display device of the wireless device.

13. The method of claim 10, further comprising sending images of control features of the game instance to the wireless device.

14. The method of claim 10, further comprising sending image data corresponding to control features of the game instance to the set top box via the first network.

15. The method of claim 10, further comprising storing an identifier associated with the wireless device to enable the wireless device to continue sending commands associated with the game instance after the game instance is resumed.

16. The method of claim 10, wherein the second network comprises a radio frequency network.

17. A computer-readable storage device storing instructions executable by a processor to perform operations comprising:

receiving a request via a first network for a game instance, the request received from a set top box, wherein the request includes first identification information associated with a first player collocated with the set top box and second identification information of a wireless device associated with a second player remotely located from the set top box;

starting the game instance;

receiving commands associated with the game instance from a controller of the first player via the first network;

receiving commands associated with the game instance from the wireless device via a second network that is different than the first network;

detecting an interruption of the game instance;

retrieving information identifying an alternative controller associated with a particular game player; and resuming the interrupted game instance based on the retrieved information.

18. The computer-readable storage device of claim 17, wherein the operations further comprise retrieving second information associated with an alternative connectivity configuration associated with the particular game player and resuming the interrupted game instance further based on the second information.

19. The computer-readable storage device of claim 17, the operations further comprising sending an identifier of the game instance to the set top box via the first network.

20. The computer-readable storage device of claim 19, the operations further comprising sending an invite to join the game instance to the wireless device associated with the second player, wherein the invite includes the identifier.

* * * * *